Nov. 15, 1932.   J. F. McMURTRIE   1,887,598
CHASSIS OF A MOTOR VEHICLE
Filed April 17, 1928   5 Sheets-Sheet 3
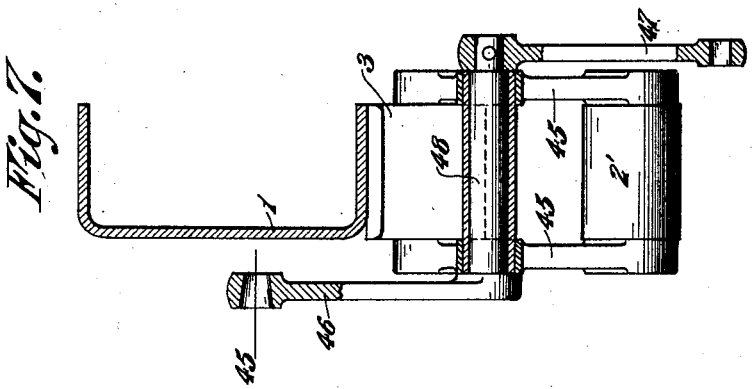
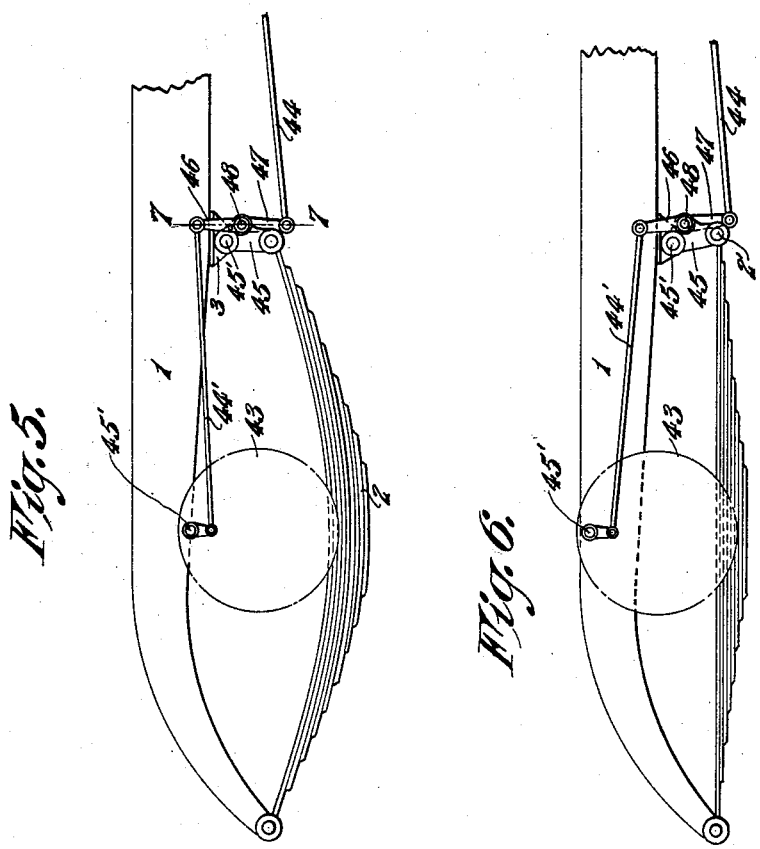
INVENTOR,
John F. McMurtrie,
BY
Harry W. Bowen.
ATTORNEY.

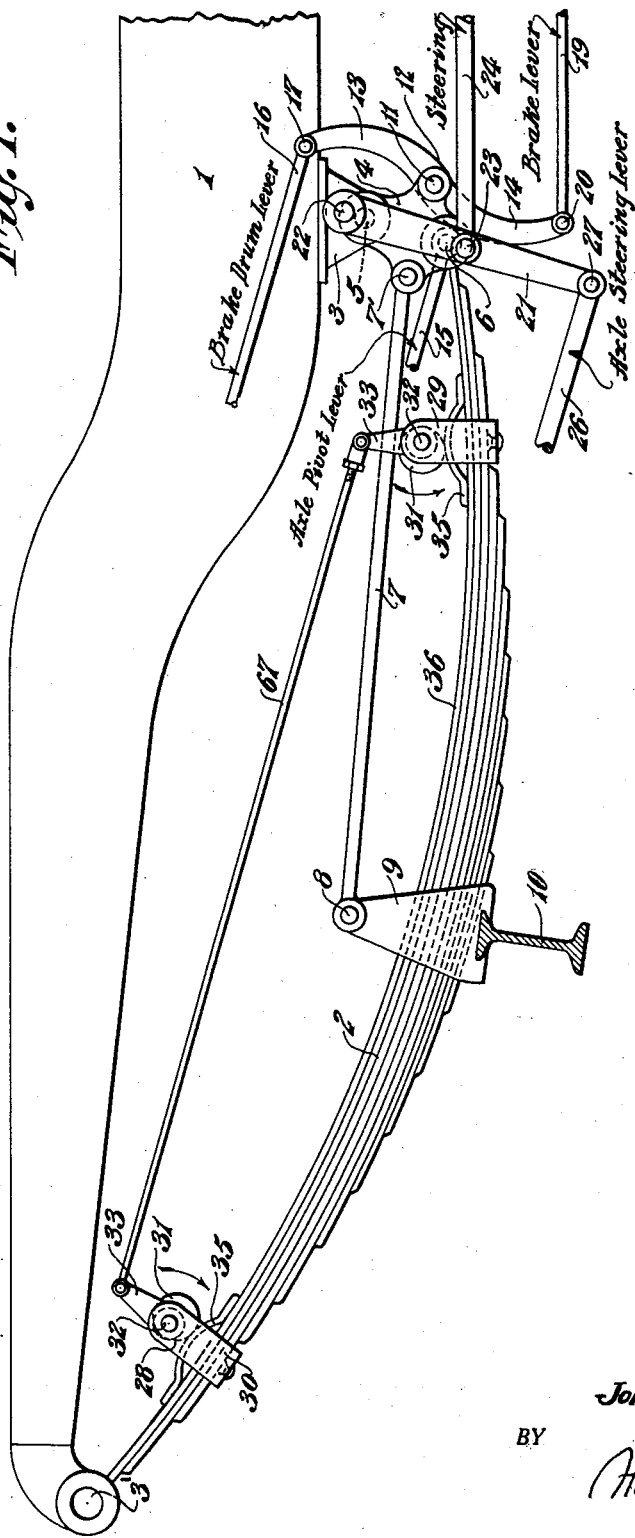

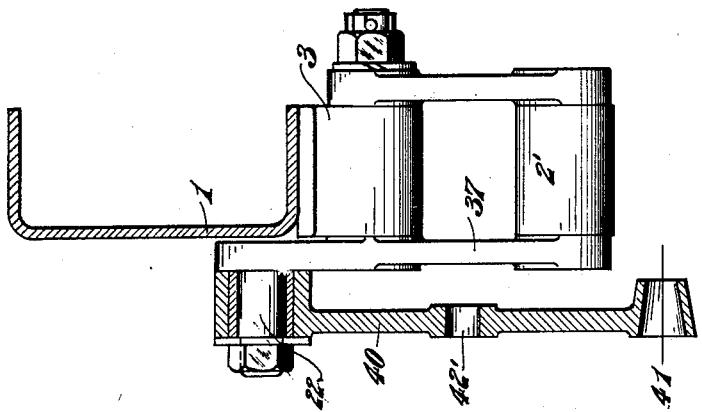

Nov. 15, 1932. J. F. McMURTRIE 1,887,598
CHASSIS OF A MOTOR VEHICLE
Filed April 17, 1928 5 Sheets-Sheet 4
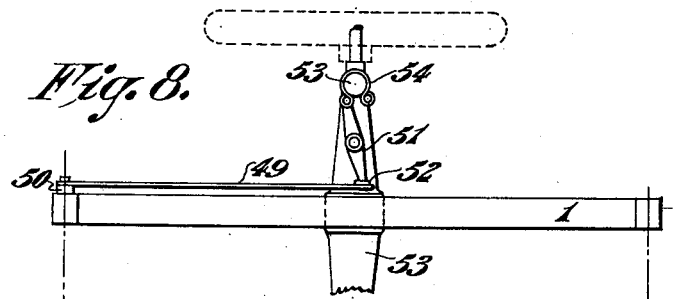
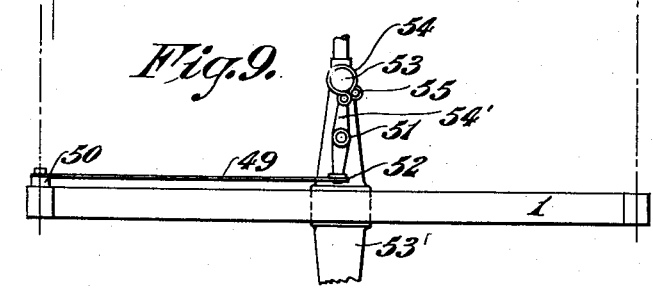
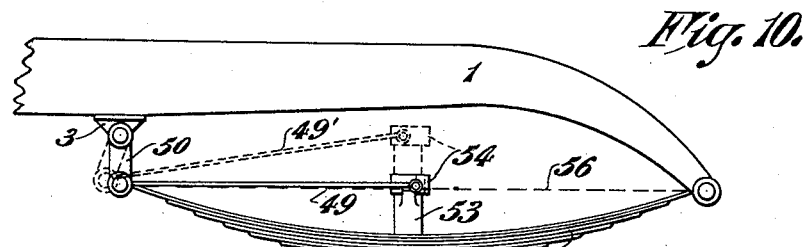
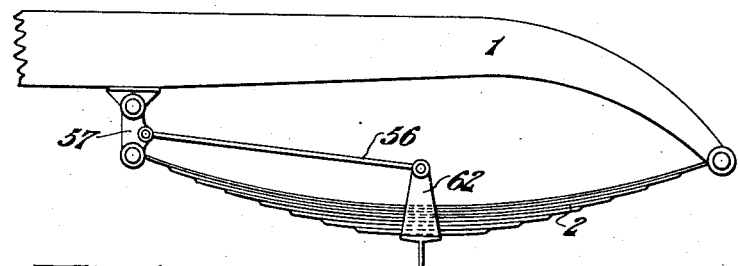
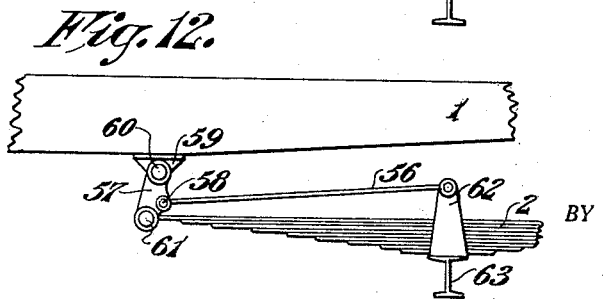
INVENTOR,
John F. McMurtrie,
BY
Harry W. Bowen.
ATTORNEY.

Nov. 15, 1932.  J. F. McMURTRIE  1,887,598

CHASSIS OF A MOTOR VEHICLE

Filed April 17, 1928  5 Sheets-Sheet 5

INVENTOR,
John F. McMurtrie,
BY Harry W. Bowen.
ATTORNEY.

Patented Nov. 15, 1932

1,887,598

UNITED STATES PATENT OFFICE

JOHN F. McMURTRIE, OF BETHLEHEM, PENNSYLVANIA, ASSIGNOR OF ONE-HALF TO WILLIAM W. HOPKINS, OF SPRINGFIELD, MASSACHUSETTS

CHASSIS OF A MOTOR VEHICLE

Application filed April 17, 1928. Serial No. 270,640.

This invention relates to improvements in the chassis of a motor vehicle and more particularly to the mechanism between the sprung and unsprung parts of a motor vehicle.

The object of the invention is to utilize or apply the elongating movements of a spring, or, the change of the length of the wheelbase in order to operate and control the effects that are caused by the elongating and flexing movements of a spring. The elongation of the spring as it straightens out is utilized by suitable connections with the brakes, axle, torque rod, a pivot brake or damper device, shock absorber and the steering mechanisms. Also, the elongation of the spring is employed in an arrangement in which the spring is tilted at an angle to the road for absorbing thrusts due to uneven roadways, the use of longer springs allow lower centers of gravity of the chassis and resulting in greater resiliency.

The basic idea is to utilize the flexure and elongating effects of a spring for other purposes as well as for resiliency purposes by making this flexure and elongating movement neutralize the effect of change of wheelbase and imparting a positive reciprocal movement to devices mentioned.

The present application is a division, in part, of the subject matter shown, described and claimed in my copending application entitled "Steering gear for automobiles", filed April 24, 1926, Serial Number 104,339 in which application the claimed subject matter relates to the steering mechanism in combination with the elongating effects of a spring. The present application is confined to other devices and means in a vehicle with which the elongating movements of a spring may be applied, as to the wheelbrake, axle torque rod, shock absorber, shimmy damper for a useful purpose and it may be utilized alone or in combination for connecting and operating any type of brake, steering mechanism, axle torque rod, shock absorber, a shimmy damper or to pivot frictional devices.

With these and other objects in view reference is had to the accompanying drawings which form a part of the specification, which illustrate obvious means by which the improvement may be applied and carried out. Modifications illustrate how existing constructions may be altered, transferred, fitted to the front or rear springs of a motor vehicle, and, for some purposes the improvements apply to any type of leaf spring, which form a part of the application and to the appended claims.

Referring to the drawings:

Fig. 1 is a side elevational view of the forward end of one of the side frames of a chassis showing one means of obtaining a tilted lower spring with my improvements as applied to the steering mechanism, the brake, torque, pivot damper and shock absorber and illustrating that these improvements may be used collectively or individually and may be used in connection with the conventional type of chassis frame member.

Fig. 2 is a view showing the normal position of a spring before upward flexure and the interconnecting links, and levers from the steering lever to the spring shackle and to the axle pivot steering lever.

Fig. 3 is a view of the parts shown in Fig. 2 after the spring has been flexed upward.

Fig. 4 is a sectional view on the line 4—4 of Fig. 2.

Fig. 5 is a view showing the spring in its normal position with the interconnecting links and levers from the brake operating link which extends from the spring shackle to the brake band lever.

Fig. 6 is a view of the parts shown in Fig. 5 with the spring flexed upward.

Fig. 7 is a sectional view on the line 7—7 of Fig. 5.

Fig. 8 is a plan view showing the interconnecting link and lever from the pivot frictional device and the spring elongating means with the brake or damper off.

Fig. 9 is a view of the parts shown in Fig. 8 after the spring is flexed and with brake or damper on.

Fig. 10 is a side view of the parts shown in Fig. 8 with the brakes or damper off and with the operating connection to the shackle of the spring; the dotted lines indicate the flexed position of the operating link when the axle pivot brake is applied.

Fig. 11 is a side view showing interconnecting link from the axle to spring shackle or elongating means when the spring is in its normal position.

Fig. 12 is a side view of the parts shown in Fig. 11 with the spring in a flexed position.

Figure 13:
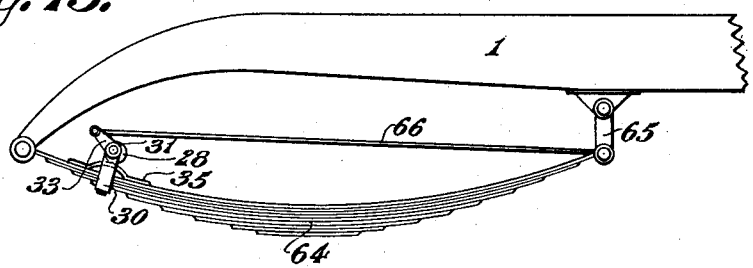
Fig. 13 is a side view showing interconnecting link and lever for operating the shock absorber with the spring in its normal position.

Referring to the drawings in detail:

In Fig. 1, 1 designates the upwardly extending portion of a side frame member at its forward part of a chassis; 2 a semi-elliptical spring which is pivotally connected thereto at 3'. 3 is a bracket which is secured to the frame 1. 4 is a link plate that is pivotally connected to the bracket 3 at 5. The rear end of the spring 2 is pivotally connected to this plate at 6. Pivotally connected to the link plate 4 at 7' is a rod or link 7 which may be termed the axle torque rod. The other end of this rod is connected at 8 to the axle saddle plate 9. The axle is indicated at 10. Also pivotally mounted on the link 4 at 11 is the double arm lever 12 having the upper and lower extension arms 13 and 14. Pivotally connected to the link plate 4 is a rod 15 which extends to and is connected to the axle pivot operating lever 52, Fig. 8, of the damper shown in Fig. 8. 16 is a rod that is pivotally connected to the arm 13 at 17; the other end of this rod is connected to the operating lever of the brake band 43 (Fig. 5). 19 is a rod which is connected to the lower arm 14 at 20 and extends to the foot pedal or brake lever of the brake (not shown).

21 is a lever that is pivotally connected to the link plate 4 at 22. (This is shown to better advantage in Fig. 4. Connected at the point 23 of the lever 21 is the steering link or rod 24 which leads back to the steering lever 42. 26 is a rod which is connected at 27 to the lower end of the lever 21. This rod is connected to the axle pivot steering rod. The operation of this part of my invention may be described as follows: When the spring 2 is flexed or bent upward it elongates, which elongating movement will move the link plate 4 on its pivot 5, rearwardly or backwardly at the connection point 6. The axle 10 at the same time will move rearwardly approximately one half the distance that the pivot 6 travels. A point is determined or located on the link plate 4 between the pivot points 5 and 6 which will move the same distance, rearwardly, as the axle and to which point the two arm lever 12, at 11, is pivotally attached. Point 22 being part of the link plate 4, which is pivoted at 5, moves rearwardly as 6 moves forwardly. This point 22 is so located that the lever 21 at point 23 moves forwardly the same distance that the axle moves backward thus the levers 21 and 13 act as compensating levers to neutralize the effect of the rearward movement of the backwardly moving point at 11. Point 17 moves back a like distance and point 20 remains fixed. At the same time rod 15 pivoted at 6 moves rearwardly and through the lever (shown at Fig. 8 at 52) operates a friction band device that is attached to the band 54 of the pivot of the steering knuckle which friction of the band 54 is greatest when the deflection of the spring is at its maximum as well as when the wheel is under the greatest stress.

It is understood that this application applies to both or either axle pivots, the object being to maintain the wheels in constant relation to the direction in which they are directed or steered and considering the "toe in" of the wheels. When one wheel is under no stress the other (due to the castor effect) will tend to turn to the direction of travel and pull the other wheel to a double "toe in" position which repeats in the opposite direction when the opposite wheel and spring is stressed. This frictional control device will permit this turning and thus stop the so-called ramping, sometimes associated with "shimmy."

For the purpose of utilizing the elongation of the spring 2 as a shock absorber, clips 28 and 29 are secured to the spring plate or leaf 30. In the clip is pivotally mounted the eccentric rollers 31 on the shafts 32. 33 are the arms for operating the rollers 31. 67 is a rod connecting the arms 33. 35 are spring plates between the rollers 31 and the spring plate 36. When the spring 2 elongates the eccentric rollers 31 will operate to exert a pressure through the friction plate 35 on the spring 2 to create a damping effect or so-called shock absorber by use of the elongating movement of a spring.

The torque rod 7 being connected to the axle 10 through the saddle plate 9 and to the link plate 4 at 7' permits the axle 10 to travel upward and rearward and maintain a constant angle to the road and at the same time prevent any torsional strains, due to the braking of the wheels, from twisting the axle 10 from its normal angular position. The frame 1 has the front horn part elevated for the purpose of tilting the spring 2 angular to the road, thus absorbing road thrust in the spring, giving the axle 10 a backwardly motion when passing over a road elevation, and a forwardly motion in passing over a road depression, allows a longer spring on the same wheel base and frame length, as well as other advantages, as greater road clearance (through straight axles) and lower frame elevation to the road. The utilization of these advantages are only possible through the use of my improvement, therefore this is made a part of my application.

Referring to the construction shown in Figs. 2, 3 and 4 which is a steering mechanism connected to a conventional frame 1. Bracket 3 is attached to this frame and pivotally connected to the bracket 3 is a link 37. This link 37 is pivotally connected to the spring at 2'. 38 indicates the distance the link 37 will move rearward at the point 42' as shown in Fig. 3. The side steering rods or links 24 connected to the usual steering box and lever 25 and 42 are at one end. The other end of the rod 24 is connected at 42' to the lever 37 the upper end of which is attached pivotally at 22 to the spring shackle link as shown. The other end of this lever 37 being attached to the other steering tube 39 at 41. In operation the spring 2 will move backwardly at the lower end of the shackle link 37 and forwardly at the upper end 22 to which lever 40 is attached pivotally, which movement allows the lever 40 to oscillate around the point 42', thus allowing the axle and pivot lever (not shown) to follow the elongating movement of the spring without changing the alignment of the wheels due to the shortening of the distance between the steering pivot lever and the main steering link 42. Fig. 4 is a section through the line 4—4 of Fig. 2 which is already described.

Referring to Figs. 5, 6 and 7. This construction is for the purpose of neutralizing the change of length or distance caused by the elongation of the spring 2 between the manually operated brake means (not shown) and the usual operating link 19 of a brake band to which link 44' is connected at 45'. Link 44 is connected to the lever having the two arms 46 and 47 and pivoted at 48 on the spring shackle lever 45 which is pivotally connected, as shown, to the spring and frame 1 in the usual manner. The other end 47 is connected to a brake rod 44 which is operated manually in the usual manner and not shown. In operation the flexure of the spring causes a shortening of the distance between the brake drum 43 and the manually operated means (not shown) and is compensated for by the oscillation of the lever having the two arms 46 and 47 around the point 48 due to rearwardly movement of the link 45 about its pivot 45' due to the elongation of the spring 2. The point 48 moves rearwardly the same distance as the wheel brake band on the axle. The construction here described is to all intents and purposes interchangeable with the described steering arrangements and likewise vice versa.

Referring to Figs. 8, 9 and 10 which describes a means for applying friction to the axle pivot by utilizing the elongation of a spring. 53 is the axle pivot around which a frictional brake band device 54 is placed with an operating lever 54' pivoted to the axle at 51 one end of which is connected to the one side of the brake band 54 and the other to a rod or link 49 at 52. The other end of the link 49 is connected to the spring shackle as shown in Fig. 10 at 50. The movement of the link 49 when the spring 2 is flexed is drawn rearwardly by the spring shackle 50, as shown by the dotted line position 49' in Fig. 10, and actuates the lever 54' around the pivot 51 which tightens the band 54 around the pivot 53 and adds friction to the axle pivot for the purpose of eliminating the so-called ramping or shimmying caused by the elongation and flexing of a spring. 53' is the axle.

In Figs. 11 and 12 is shown the utility to which the elongating movement of a spring may be applied with reference to a torque rod. 57 represents a spring shackle link to which, at 58, is pivotally connected the torque rod 56. The other end of which is connected, as shown, to the spring clamp 62 or otherwise on the axle 63, of Fig. 12. In operation, as the spring 2 flexes it causes the shackle 57 and axle 63, with connecting clamp means 62, to move rearwardly, the same distance, thus permitting the axle to move normally by spring action but preventing the axle from changing its vertically angular alignment by torsional stresses caused by braking and other causes.

From this description and drawings it will be seen that the elongating effect of the spring shown in my copending application in Figs. 6 and 7 is embodied in this divisional application. The means for preventing axle torsional effects caused by elongation of a spring is not claimed in my copending application.

Figure 14:
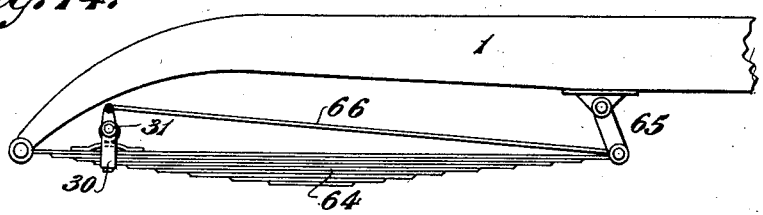
Fig. 14 is a view of the parts shown in Fig. 13 with the spring in its flexed position.

Referring to Figs. 13 and 14 the spring 64 is pivotally connected as before to the chassis 1 and the shackle lever 65 as before. The clamp 30 is attached to the spring plate by rivets. The rod 66 is connected to the shackle lever 65 at one end and at its other end to the arm 33. It will be apparent that as the spring 64 elongates as shown in Fig. 14 the cam roller 31 will operate to impart pressure on the friction plate 35 and spring, thereby, serving to prevent the spring plates or leaves from sliding on each other and therefore operate as a shock absorber or spring damper actuated by the elongation of the spring.

Figure 15:
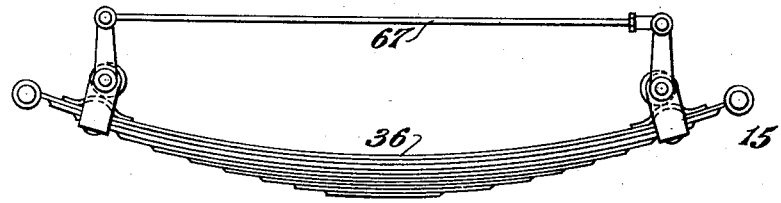
Fig. 15 is a side view of a modification of the shock absorber controlling arrangement with the spring in its normal position as well as a suggested type of shock absorber.
Figure 16:
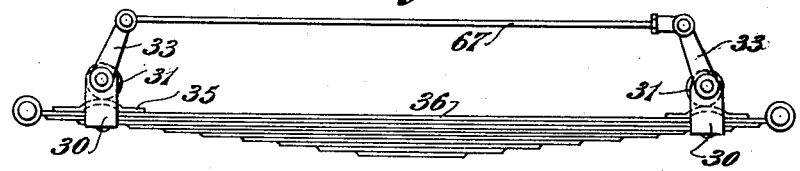
Fig. 16 is a view of the parts shown in Fig. 15 with the spring in its flexed position.

Figs. 15 and 16 represent the elongating movement of a spring as applied to a shock absorber having frictional means provided at both ends and described and illustrated in Fig. 1. It is obvious that when the spring is flexed as in Fig. 16 that the spring will elongate and cause the cam connected to the levers and rod 67 to apply pressure to the spring and increase the friction between the plates and releasing this pressure when the spring returns to the normal position as shown in Fig. 15 thus acting as a shock absorber actuated by the elongation of a spring.

It is not to be implied that the drawings represent the only means to apply this invention. I claim that my invention can be adapted to any type of multiple leaf spring and to operate as described on any of the well known devices of any design such as steering gears, brake controls, shock absorbers, torque rods, pivot controls tilted spring arrangements operated by or connected to the elongating means of a spring.

What I claim is:

1. In combination with the chassis of a motor vehicle, a spring having one end pivotally connected to the chassis frame, and axle on which the spring is mounted, a shackle lever, pivotally connected to the chassis at one end and to the free end of the spring at its other end, means connected to the shackle lever and connected to the brake bands, whereby the elongation effects of the spring due to road unevenness may be utilized for normally maintaining the brake pressure equal and irrespective of the changes in the wheel base of the vehicle.

2. In combination with the spring of a motor vehicle, shackle devices operated by and connected to the spring and chassis for applying the brakes in accordance with the elongation of the spring and change of wheel base.

3. In a shock absorber for motor vehicles link means, eccentrics, a rod attached to the link means and to the eccentrics located at or near the opposite ends of a leaf spring of the motor vehicle for subjecting the leaves of the spring to pressure as the spring is elongated due to the flexure of the spring.

4. In combination with the chassis of a motor vehicle, a spring connected thereto at one of its ends, a shackle lever connected to the chassis and to which the other end of the spring is connected, an axle connected to the spring, a rod connected to the axle at one end, the other end of this rod being connected at a point on the shackle to compensate for the elongation of the spring, which travels backward and forward the same distance as the axle for the purpose of maintaining the axle in its normal or vertical position without interfering with its other movements.

5. In combination with the chassis of a vehicle having multiple leaf springs connected thereto, shackle means to permit elongation of the leaf spring, rods connected to the said elongating means at one end, the other ends of the rod being connected to pressure energy absorbing means on the spring leaves which is located between the chassis and axle, said spring elongating means operating to impart a reciprocating movement to the rod when the spring is flexed, the reciprocating movement being utilized to apply and release and operate the energy absorbing means and which also operates as a shock absorber operating means.

6. In combination with a motor vehicle having leaf springs which are connected to the motor vehicle to permit the springs to elongate by flexure, lever means connected to the ends of the spring, the lever means operating to produce a reciprocating movement by reason of the flexure of the spring, which movement is transmitted by rods and levers for operating a friction producing means that is attached to the unsprung part of the motor vehicle.

7. In combination with a motor vehicle having multiple plate leaf springs attached thereto which will elongate when flexed, an axle attached to the central part of the spring, wheel steering pivots, connected to the axle, means attached to operate the axle pivots, a torque rod connected to the spring elongating means at one end, the other end of the rod being connected to a lever pivotally attached to the axle, the other end of the lever attached to a friction producing means which makes contact and retards the free movement of the pivot when the spring is flexed and releases when the spring returns to its normal position for the purpose of maintaining the axle pivot in its steering position by overcoming the tendency of the axle pivot to turn due to "toe in" when the weight is mostly on one side of the vehicle.

8. In combination with the springs of a chassis of a motor vehicle, the springs having a plurality of leaves, means for connecting the springs to the chassis to permit the spring, to elongate when flexed, a part connected to the said means on the springs for producing pressure between the leaves for varying the movement of the leaves relative to each other, means connecting the pressure producing means and the said part whereby the pressure means of the spring will be controlled in accordance with the flexure of the spring.

9. In combination with the chassis of a motor vehicle, a spring having one end attached to the chassis, an axle to which the spring is attached, a brake drum, a brake band therefor, a foot pedal, double arm link means interposed between the opposite end of the spring and the foot pedal operating rod to compensate for the flexure of the spring.

JOHN F. McMURTRIE.